US012676128B2

(12) United States Patent
Lee et al.

(10) Patent No.: US 12,676,128 B2
(45) Date of Patent: *Jul. 7, 2026

(54) DISPLAY DEVICE WITH IMAGE SHIFT

(71) Applicant: Samsung Display Co., Ltd., Yongin-si (KR)

(72) Inventors: Kang Hee Lee, Suwon-si (KR); Seung Ho Park, Suwon-si (KR); Mi Young Joo, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 84 days.

This patent is subject to a terminal disclaimer.

(21) Appl. No.: 18/516,853

(22) Filed: Nov. 21, 2023

(65) Prior Publication Data

US 2024/0096301 A1 Mar. 21, 2024

Related U.S. Application Data

(63) Continuation of application No. 18/124,508, filed on Mar. 21, 2023, now Pat. No. 11,847,996, which is a
(Continued)

(30) Foreign Application Priority Data

Dec. 29, 2014 (KR) ........................ 10-2014-0192063

(51) Int. Cl.
*G09G 5/393* (2006.01)
*G09G 3/00* (2006.01)

(52) U.S. Cl.
CPC ............ *G09G 5/393* (2013.01); *G09G 3/007* (2013.01); *G09G 2320/0257* (2013.01); *G09G 2330/026* (2013.01); *G09G 2330/027* (2013.01)

(58) Field of Classification Search
CPC ...................................................... G09G 3/007
See application file for complete search history.

(56) References Cited

U.S. PATENT DOCUMENTS 8,345,041 B2 1/2013 Kim et al.
2002/0075412 A1 6/2002 Tang et al.
(Continued)

FOREIGN PATENT DOCUMENTS

JP 2000-231364 8/2000
JP 2006510282 3/2006
(Continued)

OTHER PUBLICATIONS

Non-Final Office Action issued on Oct. 17, 2016 in U.S. Appl. No. 14/695,368.

(Continued)

*Primary Examiner* — Ryan Mcculley
(74) *Attorney, Agent, or Firm* — CANTOR COLBURN LLP

(57) ABSTRACT

A display device including a controller and a display panel. The controller receives original image data and output a display image signal. The display panel receives the display image signal and displays a display image corresponding to the display image signal. The controller includes an image shift controller and a memory. The image shift controller generates shifted image data by modulating the original image data to shift the display image sequentially along a preset shift path on the display panel. The memory stores a shift path value indicating a distance by which the display image has been shifted on the preset shift path. The image shift controller generates the display image signal by processing the shifted image data. When the display device is
(Continued)

powered on, the image shift controller generates shifted image data corresponding to a shift path value stored in the memory.

12 Claims, 18 Drawing Sheets

Related U.S. Application Data continuation of application No. 16/458,941, filed on Jul. 1, 2019, now Pat. No. 11,615,769, which is a continuation of application No. 14/695,368, filed on Apr. 24, 2015, now Pat. No. 10,339,901.

(56) References Cited

U.S. PATENT DOCUMENTS

| | | | |
|---|---|---|---|
| 2005/0157171 A1 | 7/2005 | Bowser | |
| 2005/0204313 A1 | 9/2005 | Enoki et al. | |
| 2006/0061658 A1 | 3/2006 | Faulkner et al. | |
| 2007/0171311 A1 | 7/2007 | Chan et al. | |
| 2007/0192821 A1 | 8/2007 | Suga | |
| 2008/0211802 A1 | 9/2008 | Yun et al. | |
| 2010/0027898 A1 | 2/2010 | Lee et al. | |
| 2013/0093802 A1 | 4/2013 | Tanaka | |
| 2015/0009249 A1* | 1/2015 | Kudo | G06T 5/94 345/691 |
| 2015/0103083 A1 | 4/2015 | Obinata et al. | |
| 2015/0194101 A1 | 7/2015 | Yaras et al. | |

FOREIGN PATENT DOCUMENTS

| | | |
|---|---|---|
| KR | 10-2005-0105574 | 11/2005 |
| KR | 1020060043797 | 5/2006 |
| KR | 10-2006-0098458 | 9/2006 |
| KR | 1020070082035 | 8/2007 |
| KR | 10-2010-0007079 | 1/2010 |
| KR | 10-2015-0102134 | 9/2015 |

OTHER PUBLICATIONS

Final Office Action issued on Mar. 20, 2017 in U.S. Appl. No. 14/695,368.
Advisory Action issued on Jun. 8, 2017 in U.S. Appl. No. 14/695,368.
Notice of Abandonment issued on Oct. 13, 2017 in U.S. Appl. No. 14/695,368.
Notice of Allowance issued on Feb. 25, 2019 in U.S. Appl. No. 14/695,368.
Non-Final Office Action dated May 18, 2020, in U.S. Appl. No. 16/458,941.
Final Office Action dated Oct. 9, 2020, in U.S. Appl. No. 16/458,941.
Notice of Allowance dated Dec. 1, 2022, in U.S. Appl. No. 16/458,941.
Notice of Allowance dated Aug. 9, 2023, in U.S. Appl. No. 18/124,508.

* cited by examiner

FIG. 5

| SHIFT INDEX | 1 | 2 | 3 | 4 | 5 | 6 | 7 | • • • | N |
|---|---|---|---|---|---|---|---|---|---|
| X-DIRECTION SHIFT | 0 | 1 | 1 | 0 | -1 | -1 | -1 | • • • | i |
| Y-DIRECTION SHIFT | 0 | 0 | -1 | -1 | -1 | 0 | 1 | • • • | j |

DISPLAY DEVICE WITH IMAGE SHIFT

CROSS-REFERENCE TO RELATED APPLICATION

This application is a Continuation of U.S. patent application Ser. No. 18/124,508, filed Mar. 21, 2023, which is a Continuation of U.S. patent application Ser. No. 16/458,941, filed on Jul. 1, 2019, issued as U.S. Pat. No. 11,615,769, which is a Continuation of U.S. patent application Ser. No. 14/695,368, filed Apr. 24, 2015, issued as U.S. Pat. No. 10,339,901, and claims priority from and the benefit of Korean Patent Application No. 10-2014-0192063, filed on Dec. 29, 2014, each of which is hereby incorporated by reference for all purposes as if fully set forth herein.

BACKGROUND

1. Field

One or more embodiments described herein relate to a display device.

2. Description of the Related Art

Monitors, televisions, and portable displays are being made from liquid crystal displays, organic electroluminescent displays, and other flat panel displays because they are lighter and thinner than their conventional cathode ray tube counterparts. Flat panel displays are used for a variety of indoor and outdoor purposes. When used, for example, to display public information, flat panel displays may display one still image for a long period of time or may repeatedly display several still images at relatively long time intervals.

SUMMARY

In accordance with one or more embodiments, a display device includes a controller to receive original image data and output a display image signal; and a display panel to receive the display image signal and display a display image corresponding to the display image signal, wherein the controller includes: an image shift controller to generate shifted image data by modulating the original image data to shift the display image sequentially along a preset shift path on the display panel, and a memory to store a shift path value indicating a distance by which the display image has been shifted on the preset shift path, wherein the image shift controller is to generate the display image signal by processing the shifted image data, and when the display device is powered on, the image shift controller is to generate shifted image data corresponding to a shift path value stored in the memory.

The image shift controller may compare image data for at least two successive frames, and when a proportion of same image data in the at least two successive frames exceeds a preset threshold value, generate the shifted image data by modulating the original image data to shift the display image to a next location on the preset shift path.

The image shift controller may compare image data corresponding to at least two successive frames, count the image data corresponding to the at least two successive frames as being identical when the proportion of the same image data exceeds the preset threshold value, and generate the shifted image data by modulating the original image data to shift the display image to a next location on the preset shift path, when a cumulative count value for image data corresponding to three or more frames is equal to or greater than a preset threshold value.

The image shift controller may generate the shifted image data by modulating the original image data to shift the display image continuously and sequentially along a series of locations on the preset shift path at predetermined time intervals.

The preset shift path may include a quadrilateral spiral pattern which winds outwardly from a center location. The preset shift path may include a zigzag pattern in which the display image is to be shifted in a first direction multiple times, shifted in a second direction once, and then shifted in a third direction multiple times in a repeated manner.

A display image corresponding to the shifted image data may includes a blank between at least an edge of the display panel and an edge of the display image, and the blank may correspond to no image in the original image data. The blank of the display image corresponding to the shifted image data may be filled with black image data. The portion of the display image adjacent to the blank may be enlarged, and the blank of the display image corresponding to the shifted image data may be filled with the enlarged portion. The display image may be shifted by one pixel column or one pixel row each shift.

The memory maybe a nonvolatile memory. The memory may include a lookup table indicating the preset shift path, and the image shift controller may receive an operation start signal when the display device is powered on, read a shift path value stored in the memory based on the operation start signal, and generate shifted image data corresponding to the stored shift path value by referring to the lookup table.

The image shift controller may include an image smoother, the image shift controller may receive current frame image data and previous frame image data, generate shifted image data for the current frame image data and shifted image data for the previous frame image data by referring to the shift path value, and send the shifted image data for the current frame image data and the shifted image data for the previous frame image data to the image smoother, and the image smoother may compare the shifted image data for the current frame image data and the shifted image data for the previous frame image data, and to modulate the shifted image data for the current frame image data to increase or decrease a gray value for pixels having gray values different from those of corresponding pixels of the shifted image data for the previous frame image data by more than a predetermined threshold value.

The image smoother may modulate the shifted image data for the current frame image data such to increase or decrease the gray value by one gray value in each frame for the pixels having gray values different from those of the corresponding pixels of the shifted image data for the previous frame image data by more than the predetermined threshold value.

In accordance with one or more other embodiments, a display device includes a controller to receive original image data and output a display image signal; and a display panel to receive the display image signal and display a display image corresponding to the received display image signal, wherein the controller includes: an image shift controller to generate shifted image data by modulating the original image data to shift the display image sequentially along a preset shift path on the display panel, and a memory which to store a shift path value indicating a distance by which the display image has been shifted on the preset shift path, wherein the image shift controller is to: generate the display image signal by processing the shifted image data, and when the display device is powered on, generate shifted image data corresponding to a shift path value for a start location on the preset shift path, generate shifted image data to shift the display image sequentially along a reduced path on the display panel, and then generate shifted image data corresponding to a shift path value stored in the memory.

The reduced path may include a path along which a display image for the shifted image data corresponding to the shift path value for the start location on the preset shift path is shifted by one pixel per location in first and second directions of the display panel to reach a display image for the shifted image data corresponding to the shift path value stored in the memory.

The memory may be a nonvolatile memory. The memory may include a lookup table indicating the preset shift path, and the image shift controller may receive an operation start signal when the display device is powered on, read a shift path value stored in the memory based on the operation start signal, and generate shifted image data corresponding to the stored shift path value by referring to the lookup table.

In accordance with one or more other embodiments, a display device includes a controller to receive original image data and output a display image signal; and a display panel to receive the display image signal and display a display image corresponding to the received display image signal, wherein the controller includes: an image shift controller to generate shifted image data by modulating the original image data to shift the display image sequentially along a preset shift path on the display panel, and a memory to store a shift path value indicating a distance by which the display image has been shifted on the preset shift path, the image shift controller to: generate the display image signal by processing the shifted image data, and when the display device is powered on, generate shifted image data corresponding to a shift path value for a start location on the preset shift path and then generate shifted image data corresponding to a shift path value stored in the memory.

The memory may be a nonvolatile memory. The memory may include a lookup table indicating the preset shift path, and the image shift controller may receive an operation start signal when the display device is powered on, read a shift path value stored in the memory based on the operation start signal, and generate shifted image data corresponding to the stored shift path value by referring to the lookup table.

BRIEF DESCRIPTION OF THE DRAWINGS

Features will become apparent to those of skill in the art by describing in detail exemplary embodiments with reference to the attached drawings in which:

FIG. 5 illustrates an embodiment of lookup table for a preset shift path;

DETAILED DESCRIPTION

Figure 1:
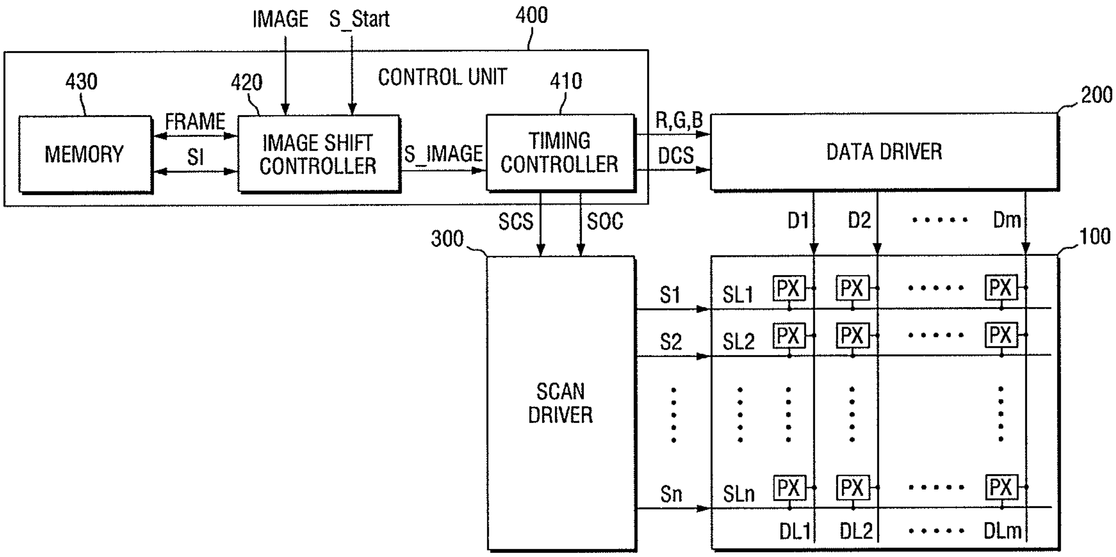
FIG. 1 illustrates an embodiment of a display device.

Example embodiments are described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. Like reference numerals refer to like elements throughout.

It will be understood that when an element or layer is referred to as being "on," or "connected to" another element or layer, it can be directly on or connected to the other element or layer or intervening elements or layers may be present. In contrast, when an element is referred to as being "directly on" or "directly connected to" another element or layer, there are no intervening elements or layers present. As used herein, the term "and/or" includes any and all combinations of one or more of the associated listed items.

FIG. 1 illustrates an embodiment of a display device 10 which includes a display panel 100, a data driver 200, a scan driver 300, and a control unit 400. The display panel 100 includes a plurality of scan lines SL1 through SLn, a plurality of data lines DL1 through DLm, and a plurality of pixel regions PX. The scan lines SL1 through SLn extend in a first direction (e.g., a horizontal direction) and deliver a plurality of scan signals S1 through Sn to the pixel regions PX of the display panel 100. The data lines DL1 through DLm extend in a second direction (e.g., a vertical direction) and deliver a plurality of data signals D1 through Dm to the pixel regions PX based on the scan signals S1 through Sn of the scan lines SL1 through SLn. The pixel regions PX are at intersections of the scan lines SL1 through SLn and the data lines DL1 through DLm.

The data driver 200 may receive a display image signal R,G,B and a data control signal DCS from a timing controller 410 and transmits the display image signal R,G,B and the data control signal DCS to the data lines DL1 through DLm. The data driver 200 may include a latch circuit and a level shifter circuit. The latch circuit may store converted image data received in series and transmit the converted image data to the display panel 100 in parallel. The level shifter circuit may adjust the level of a voltage actually applied to the display panel 100 according to the converted image data.

The scan driver 300 may receive a scan control signal SCS from the timing controller 410 and sequentially transmits the scan signals S1 through Sn to the scan lines SL1 through SLn based on the scan control signal SCS. The scan signals S1 through Sn may perform a switching role to allow the data signals D1 through Dm from the data lines DL1 through DLm to be transmitted to a plurality of pixels.

In FIG. 1, the data driver 200, the scan driver 300, and the display panel 100 are illustrated as separate functional blocks. However, the data driver 200 and the scan driver 300 may be included in the same or different integrated circuit (IC) chips mounted on at least an area of the display panel 100 or in the same or different driver circuits formed on at least part of the display panel 100.

The control unit 400 includes the timing controller 410, an image shift controller 420, and a memory 430. The timing controller 410 receives a shifted image signal S_IMAGE from the image shift controller 420, processes the shifted image signal S_IMAGE into the display image signal R,G,B, and transmits the display image signal R,G,B to the data driver 200. In addition, the timing controller 410 outputs the data control signal DCS and the scan control signal SCS for driving the data driver 200 and the scan driver 300 in synchronization with the display image signal R,G,B. The display image signal R,G,B may be a signal indicative of a gray value of each of the pixels in the display panel 100, which is obtained by processing the shifted image signal S_IMAGE. The timing controller 410 may process the shifted image signal S_IMAGE into the display image signal R,G,B, for example, by additionally modulating or compensating the shifted image signal S_IMAGE based on a user preference and/or device characteristics of the display device 10.

The image shift controller 420 receives original image data IMAGE and generates the shifted image signal S_IMAGE. For example, the image shift controller 420 may generate the shifted image signal S_IMAGE by modulating the received original image data IMAGE so that an image displayed on the display panel 100 may be shifted sequentially along a preset shift path.

In addition, the image shift controller 420 may store a shift path value SPV indicating a distance by which an image has been shifted on the preset shift path in the memory 430, or may read the shift path value SPV from the memory 430. The image shift controller 420 may also store received image data in the memory 430. Further, the image shift controller 420 may read from the memory 430 image data stored in the memory 430 in a previous frame and compare the original image data IMAGE of a current frame with the image data of the previous frame.

The memory 430 may be a nonvolatile memory that retains the stored shift path value SPV even when the display device 10 is powered off. The memory 430 may be, for example, a flash memory, an electrically erasable programmable read-only memory (EEPROM), or another type of memory.

The shift path value SPV may include a shift index SI indicating the number of shifts on the shift path and shift coordinate values indicating how much a display image has been shifted in the horizontal direction and the vertical direction. In the present specification, assuming that the number of points or locations existing on one shift path is N (where N is a natural number), the shift index SI has a value of 1 to N. In addition, the shift coordinate values indicate the number of pixels by which the original image data IMAGE has been shifted in the horizontal and vertical directions of the display device 10 and are expressed as coordinates (i,j), where i and j are integers.

The term 'pixel,' as used herein, corresponds to one 'dot' in image data including a plurality of 'dots' and corresponds to one dot (e.g., a red, green or a blue pixel) for expressing the one 'dot' in the image data among a plurality of dots on the display panel 100.

When the display device 10 is powered on after being powered off, an image shift processor 422 receives an operation start signal S_START indicating that the display device 10 has been powered on and reads the shift path value SPV from the memory 430. The image shift processor 422 may output the shifted image signal S_IMAGE by modulating the original image data IMAGE according to the shift path value SPV.

Accordingly, in one embodiment, when the display device 10 is powered on after being powered off, the image shift controller 420 may shift the original image data IMAGE to a location corresponding to the shift path value SPV, not to a start location on the shift path, e.g., a location where the shift index SI has a value of one or the shift coordinate values are (0,0).

In FIG. 1, the timing controller 410 and the image shift controller 420 are illustrated as separate blocks. However, As part of an image processing algorithm of the timing controller 410, the image shift controller 420 may be an algorithm for performing an image shift function as described herein. In another embodiment, the timing controller 410 and the image shift controller 420 may be, for example, one or more modules in an IC chip.

Figure 2:
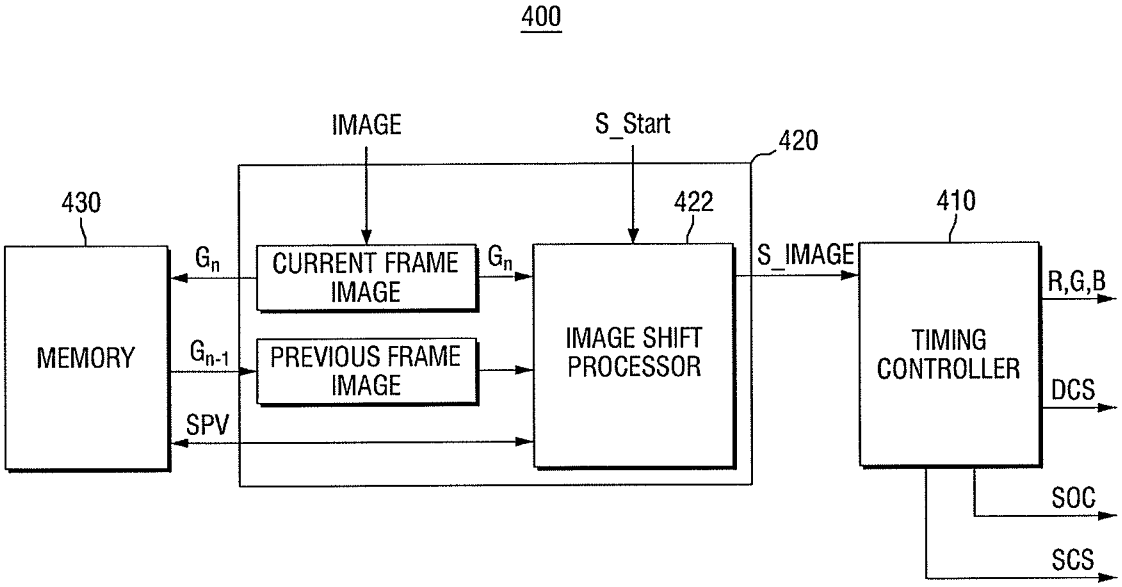
FIG. 2 illustrates an embodiment of a control unit.

FIG. 2 illustrates an embodiment of control unit 400. Referring to FIG. 2, the image shift controller 420 receives the original image data IMAGE and stores the original image data IMAGE in the memory 430 as a current frame image Gn. The current frame image Gn may be provided to the image shift processor 422 of the image shift controller 420, and the image shift processor 422 may read a previous frame image Gn−1 and the shift path value SPV from the memory 430.

The image shift processor 422 may cumulatively compare the previous frame image Gn−1 and the current frame image Gn to determine whether the previous frame image Gn−1 and the current frame image Gn are identical. If the same image is continuously repeated over a number of frames, the image shift processor 422 may shift the current frame image Gn to a next location on the shift path to generate the shifted image signal S_IMAGE.

For example, the image shift processor 422 may compare pixels of the previous frame image Gn−1 with corresponding pixels of the current frame image Gn. When the proportion of identical pixels is equal to or greater than a predetermined value (e.g., 90% or more), the image shift processor 422 considers the previous frame image Gn−1 and the current frame image Gn to be identical. When a cumulative count value is equal to or greater than a predetermined threshold value (e.g., 1,000), the current frame image Gn may be shifted to a next location on the shift path.

The image shift controller 420 determines whether a condition for shifting an image is satisfied by comparing the current frame image Gn and the previous frame image Gn−1. In another embodiment, the image shift controller 420 may determine whether a different condition is satisfied for shifting the image.

The image shift controller 420 may actively determine whether an image shift condition is satisfied as in the embodiment of FIG. 2. In another embodiment, a normal mode or an image shift mode may be passively selected by a user or a device manufacturer. For example, if the user or the device manufacturer sets the display device 10 to the image shift mode, the image shift controller 420 may continuously and sequentially shifted image data along a series of locations on the shift path at predetermined time intervals.

In another embodiment, the image shift controller 420 may use a hybrid method which shifts an image to sequential locations by actively determining whether an image shift condition is satisfied after the image shift mode is passively set by the user or the device manufacturer.

Figure 3:
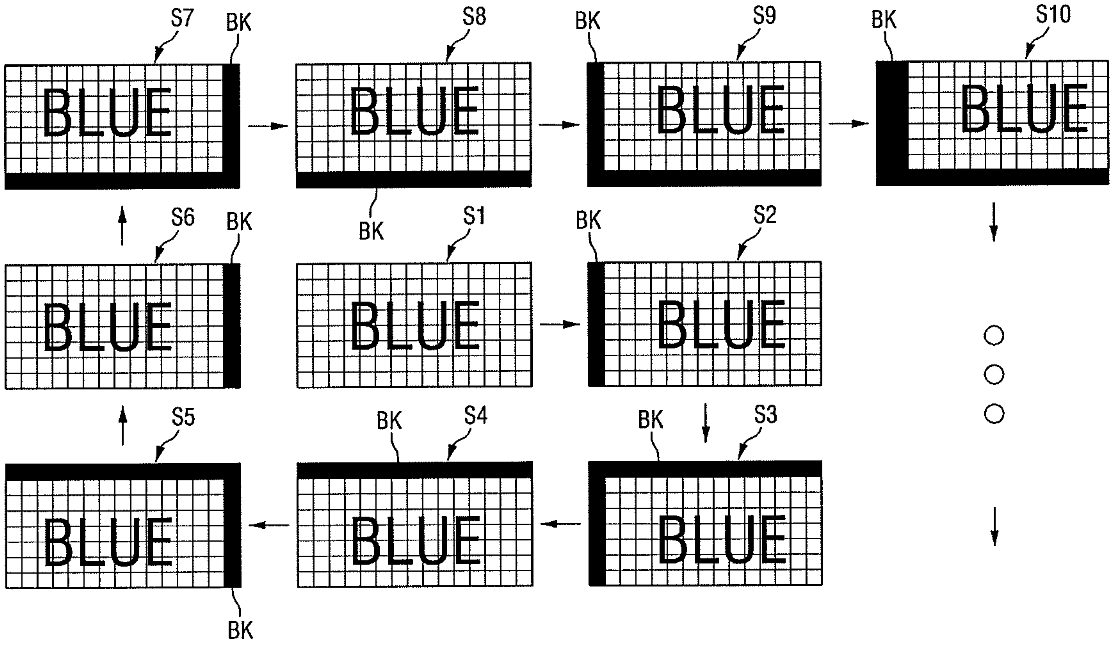
FIG. 3 illustrates an embodiment for shifting an image.
Figure 4:
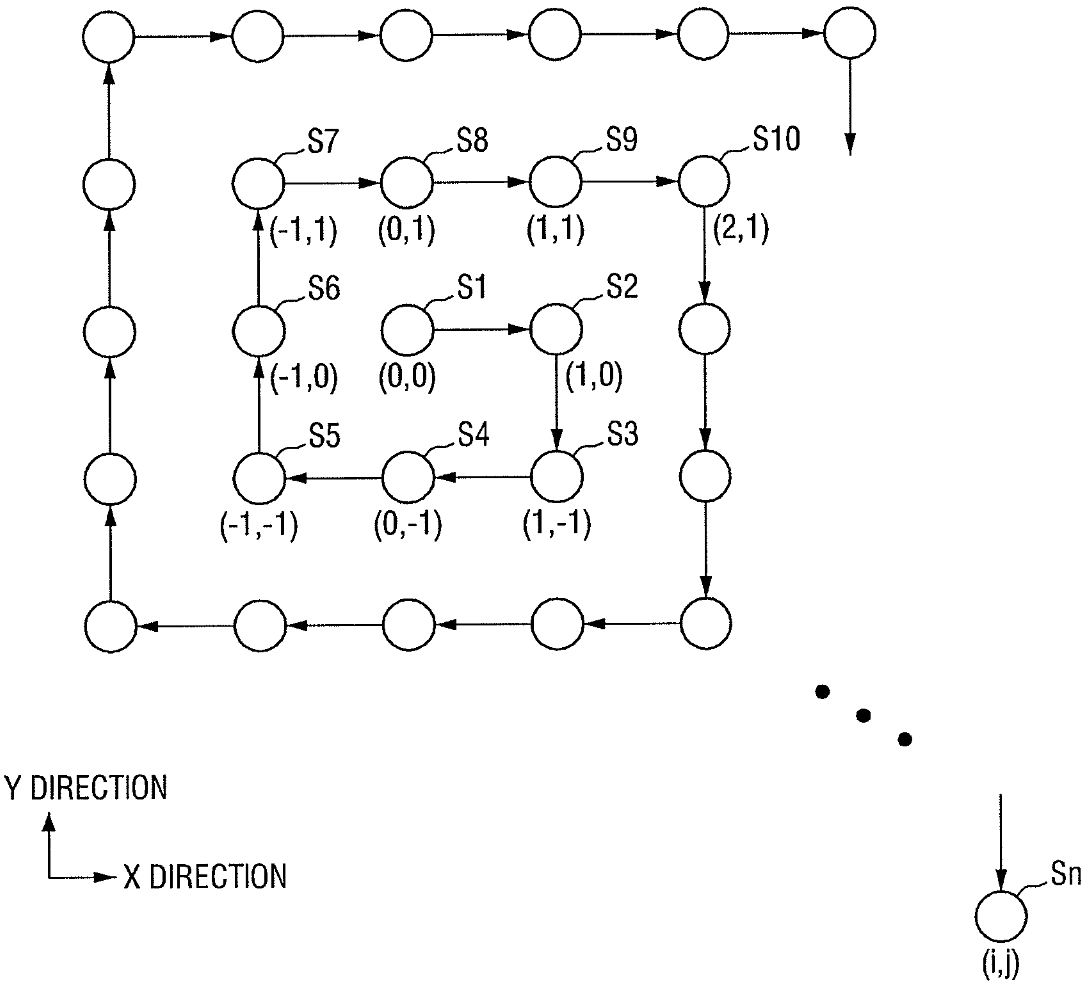
FIG. 4 illustrates an example of shift locations and directions of an image.

FIGS. 3 through 5 illustrate embodiments of a process for shifting an image along a preset shift path, the shape of a pattern of the preset shift path, and a lookup table indicating the preset shift path.

FIG. 3 illustrates an embodiment of a process for shifting a display image sequentially from a start location on a preset shift path having a quadrilateral spiral pattern. Referring to FIG. 3, the original image data IMAGE may be processed such that a display image is displayed at a location to which no image is shifted, e.g., the start location on the preset shift path. Accordingly, the display panel 100 may display a first shifted image S1. The shift path value SPV corresponding to the first shifted image S1 may be represented by a shift index S1 of 1 or shift coordinate values of (0,0).

When an image shift condition is satisfied, the image shift controller 420 may modulate the original image data IMAGE into the shifted image signal S_IMAGE such that the display image is shifted to a next location on the preset shift path. Accordingly, the display panel 100 may display a second shifted image S2.

In the embodiment of FIG. 3, the display image is a still image having "BLUE" at the center against a lattice pattern in the background, and the preset shift path has a quadrilateral spiral pattern that winds outward from the center in a clockwise direction.

The image having "BLUE" at the center against the lattice pattern in the background has overall been shifted to the right in the second shifted image S2 as compared in the first shifted image S1. Accordingly, a portion of a right edge area of the first shifted image S1 may lie beyond a right edge of the display panel 100. As a result, the portion that lies beyond the right edge of the display panel 100 may not be displayed. Also, a blank BK corresponding to no image data may be formed between a left edge of the display image and a left edge of the display panel 100. The second shifted image S2 may have the blank BK in a left edge area filled with predetermined image data, e.g., black image data. In another embodiment, a portion of the display image adjacent to the blank BK may be enlarged and the blank BK may be filled with the enlarged portion. The shift path value SPV corresponding to the second shifted image S2 may be represented by a shift index SI of 2 or shift coordinate values of (1,0).

In the embodiment of FIG. 3, a distance by which the display image is shifted (e.g., a distance by which the first shifted image S1 is shifted to the right to generate the second shifted image S2) is exaggerated for ease of understanding. In reality, however, the display image may be shifted by too small a distance for a user of the display device 10 to recognize. For example, the display image may be shifted by a predetermined number of pixel columns or rows, e.g., 1 to 10 pixel columns or rows. The distance by which the display image is shifted may vary, for example, according to the place and purpose of use of the display device 10 and the type of the display image.

Next, when the image shift condition is satisfied, the display image may be shifted to a next location on the preset path. Accordingly, the display panel 100 may display a third shifted image.

The image having "BLUE" at the center against the lattice pattern in the background has overall been shifted downward in the third shifted image as compared in the second shifted image S2. Accordingly, a portion of a lower edge area of the second shifted image S2 may lie beyond a lower edge of the display panel 100. The portion that lies beyond the lower edge of the display panel 100 may not be displayed. A blank BK corresponding to no image data may be formed between the left edge of the display image and the left edge of the display panel 100 and between an upper edge of the display image and an upper edge of the display panel 100. The third shifted image may have the blank BK in a left edge area and an upper edge area filled with predetermined image data, e.g., black image data. The shift path value SPV corresponding to the third shifted image may be represented by a shift index SI of 3 or shift coordinate values of (1,−1).

In this way, whenever the image shift condition is satisfied, the display image is shifted, and third through tenth shifted images are sequentially displayed on the display panel 100 along the preset shift path.

The image having "BLUE" at the center against the lattice pattern in the background has overall been shifted to the right in the tenth shifted image as compared in the ninth shifted image. Accordingly, the blank BK in a left edge area of the tenth shifted image may be thicker than the blank BK in a left edge area of the ninth shifted image. In FIG. 3, the distance by which the display image is shifted is exaggerated for ease of understanding, and a difference in thickness between the blank BK in the left edge area of the tenth shifted image and the blank BK in the left edge area of the ninth shifted image may be a predetermined number of pixels e.g., 1 to 10 pixels. The shift path value SPV corresponding to the tenth shifted image may be represented by a shift index SI of 10 or shift coordinate values of (2,1).

FIG. 4 illustrates an example of locations and directions for shifting an image sequentially along a preset shift path having a quadrilateral spiral pattern. Referring to FIG. 4, the preset shift path is shaped in a quadrilateral spiral pattern that winds outward from the center in the clockwise direction.

For example, when first through Nth shift coordinate values (0,0) through (i,j) (where i and j are integers) of first through Nth shifted images are arranged in order of shift indices S1 through SN of the first through Nth shifted images, a spiral pattern may be formed that winds outward from the center in the clockwise direction. In another embodiment, the preset shift path may be different from a quadrilateral spiral pattern.

FIG. 5 illustrates an example of a lookup table indicating a preset shift path having a quadrilateral spiral pattern. Referring to FIG. 5, a distance by which a non-shifted display image or the first shifted image S1 corresponding to the original image data IMAGE is shifted in a first direction (e.g., the horizontal direction x of the display panel 100) or a second direction (e.g., the vertical direction y of the display panel 100) for each shift index SI is stored in the form of a lookup table.

The lookup table of FIG. 5 corresponds to the quadrilateral spiral pattern of FIG. 4, and x- and y-direction shift values corresponding to each shift index SI may correspond to each shift coordinate values on the preset shift path. In another embodiment, the preset shift path may correspond to a different pattern by changing the x- and y-direction shift values corresponding to each shift index SI of the lookup table.

FIGS. 6 to 8A illustrate embodiments in which the image shift processor 422 of the display device 10 generates an initial shifted image in the case of multiple power ons and offs based on the shift path value SPV stored in the memory 430.

Figure 6:
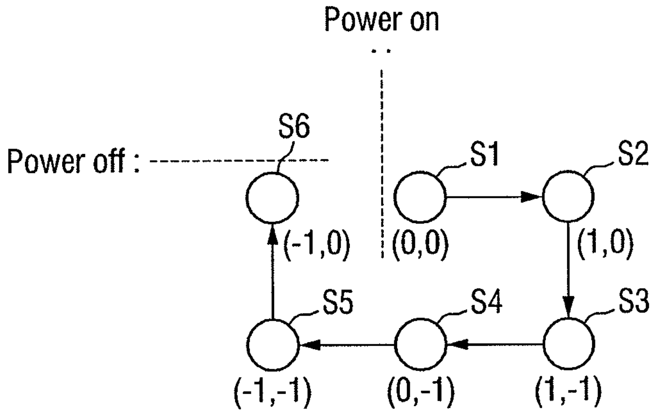
FIG. 6 illustrates another embodiment of shifting an image.

More specifically, FIG. 6 illustrates an embodiment of locations and directions for shifting an image is sequentially along a preset shift path having a quadrilateral spiral pattern for a period of time until the display device 10 is powered off after being powered on for the first time.

Figure 7:
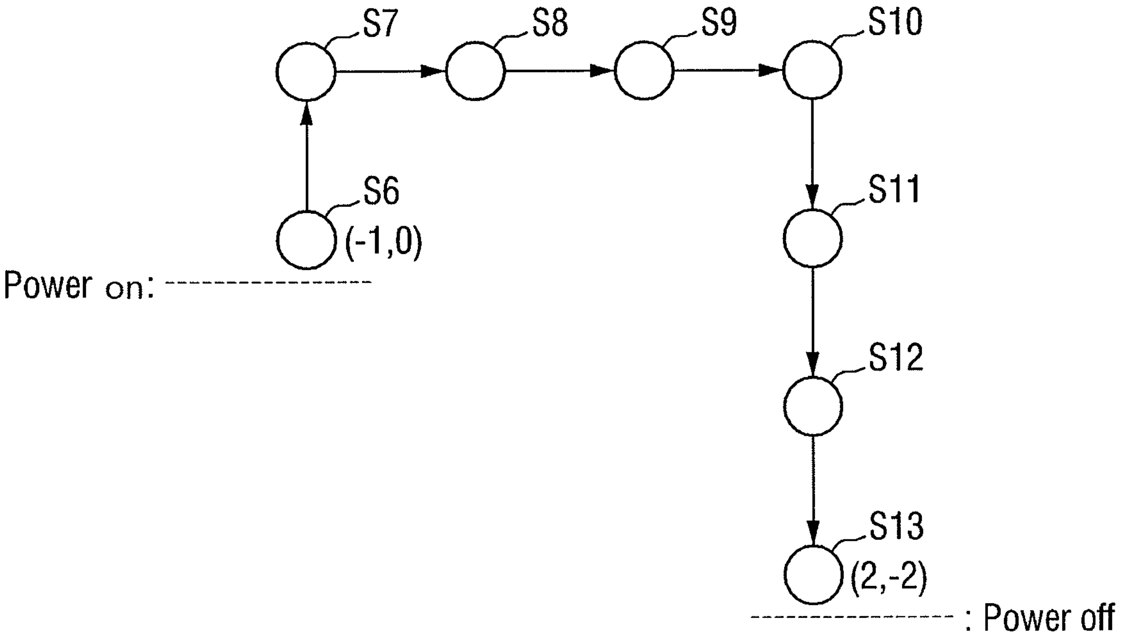
FIG. 7 illustrates another embodiment of shifting an image.

FIG. 7 illustrates an embodiment of locations and directions for shifting an image sequentially along the preset shift path having the quadrilateral spiral pattern for a period of time until the display device 10 is powered on after being powered off in FIG. 6 and then powered off again.

Figure 8:
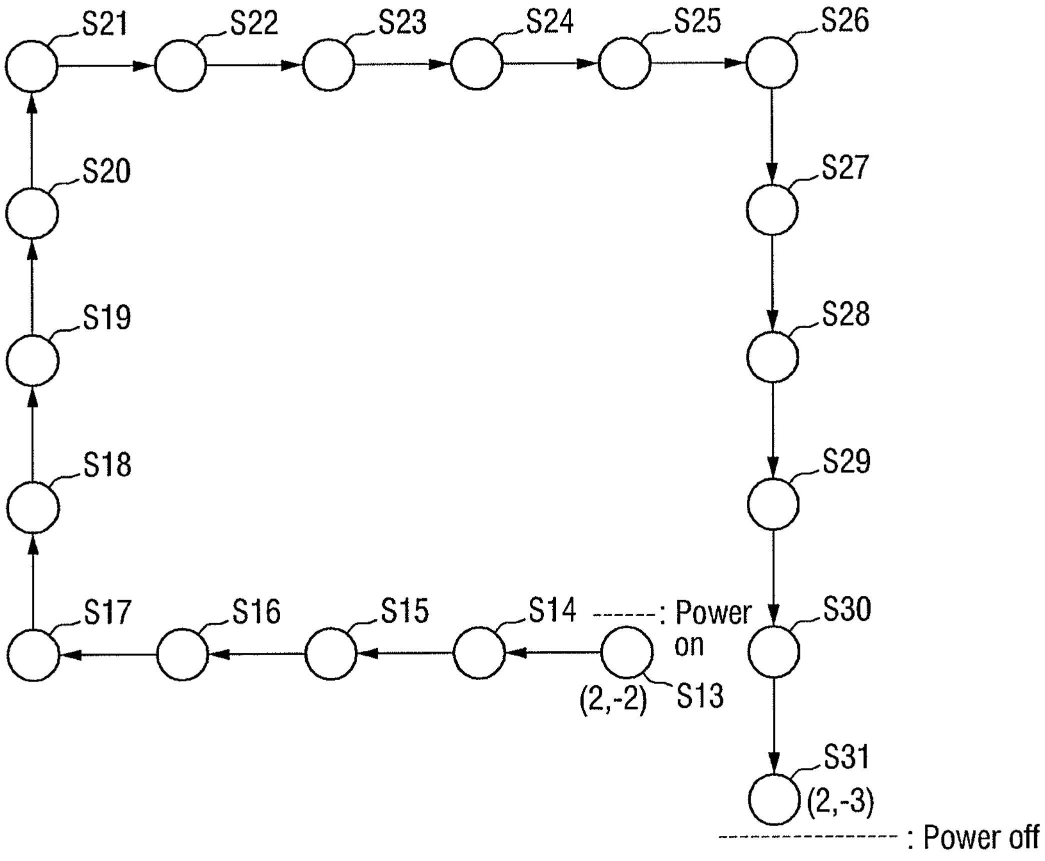
FIG. 8 illustrates another embodiment of shifting an image.

FIG. 8 illustrates an embodiment of locations and directions for shifting an image sequentially along the preset shift path having the quadrilateral spiral pattern for a period of time until the display device 10 is powered on after being powered off in FIG. 7 and then powered off again.

When the display device 10 is powered on after being powered off, the image shift processor 422 receives the operation start signal S_START indicating that the display device 10 has been powered on and reads the shift path value SPV stored in the memory 430. The image shift processor 422 outputs the shifted image signal S_IMAGE, for example, by modulating the original image data IMAGE according to the shift path value SPV.

The image shift processor 422 store a current shift path value SPV in the memory 430, for example, whenever the display device 10 is powered off or whenever the image is shifted.

Accordingly, when the display device 10 is powered on after being powered off, the image shift controller 420 shifts the original image data IMAGE to an appropriate location by referring to the stored shift path value SPV, not to the start location on the preset shift path, e.g., the location represented by a shift index SI of 1 or shift coordinate values of (0,0).

For example, when the display device 10 is powered on after being powered off, the image shift controller 420 may generate shifted image data by converting the original image data IMAGE such that a shifted image corresponding to the shift path value SPV stored in the memory 430 is displayed first when the display device 10 is powered on. In the embodiments of FIGS. 6 through 8, a shifted image corresponding to the shift path value SPV stored in the memory 430 is displayed first when the display device 10 is powered on after being powered off.

In another embodiment, a shifted image displayed first when the display device 10 is powered on may be set to a shifted image at a next location on the preset shift path, for example, a shifted image corresponding to a next shift path value SPV on the preset shift path of shift path values SPV stored in the memory 430.

Referring to FIG. 6, when the display device 10 is powered on for the first time, the original image data IMAGE may be processed to be displayed at a location to which no image is shifted, e.g., a start location on the preset shift path. Accordingly, the display panel 100 may display the first shifted image S1. Then, whenever an image shift condition is satisfied, the image shift controller 420 may shift the first shifted image S1 sequentially to generate a sixth shifted image S6.

While the sixth shifted image S6 is being displayed, the display device 10 may be powered off. Here, the shift path value SPV corresponding to the sixth shifted image S6, that is, a shift index SI of 6 or shift coordinate values of (−1,0), may be stored in the memory 430 and the operation of the image shift controller 420 may be stopped.

Referring to FIG. 7, when the display device 10 is powered on again after being powered off in FIG. 6, the image shift controller 420 may modulate the original image data IMAGE such that a shifted image (e.g., the sixth shifted image S6) corresponding to the shift path value SPV stored in the memory 430 is displayed.

For example, referring back to FIG. 2, the image shift processor 422 may receive the operation start signal S_START indicating that the display device 10 has been powered on and read the shift path value SPV (e.g., a shift index SI of 6 or shift coordinate values of (−1,0)) from the memory 430. In addition, the image shift processor 422 may output the shifted image data S_IMAGE corresponding to the sixth shifted image S6 by modulating the original image data IMAGE with reference to the lookup table indicating the preset shift path.

Accordingly, the same shifted image as the sixth shifted image S6 displayed before the display device 10 was powered off may be displayed first when the display device 10 is powered on again. In this way, whenever the image shift condition is satisfied, the image shift controller 420 may shift the sixth shifted image S6 sequentially to generate a thirteenth shifted image S13.

While the thirteenth shifted image S13 is being displayed, the display device 10 may be powered off. Here, the shift path value SPV corresponding to the thirteenth shifted image S13, that is, a shift index SI of 13 or shift coordinate values of (1,−2) may be stored in the memory 430 and the operation of the image shift controller 420 may be stopped.

Referring to FIG. 8, when the display device 10 is powered on again after being powered off in FIG. 7, the image shift controller 420 may modulate the original image data IMAGE such that a shifted image (e.g., the thirteenth shifted image S13) corresponding to the shift path value SPV stored in the memory 430 is displayed.

For example, referring back to FIG. 2, the image shift processor 422 may receive the operation start signal S_START indicating that the display device 10 has been powered on and read the shift path value SPV (e.g., a shift index SI of 13 or shift coordinate values of (1,−2)) from the memory 430. In addition, the image shift processor 422 may output image data corresponding to the thirteenth shifted image S13 by modulating the original image data IMAGE with reference to the lookup table indicating the preset shift path.

Accordingly, the same shifted image as the thirteenth shifted image S13 displayed before the display device 10 was powered off may be displayed first when the display device 10 is powered on again. In this way, whenever the image shift condition is satisfied, the image shift controller 420 may shift the thirteenth shifted image S13 sequentially to generate a thirtieth shifted image S30.

When the display device 10 is powered on after being powered off in FIG. 8, the image shift controller 420 may modulate the original image data IMAGE such that the thirtieth shifted image S30 is displayed first when the display device 10 is powered on. This image shift process may be continuously performed along the preset shift path.

Therefore, the image shift condition may be satisfied the same number of times for each shifted image along the preset shift path. For example, when the image shift condition is that the same image should be displayed for a predetermined period of time or longer, shifted images on the preset shift path (excluding a shifted image displayed first when the display device 10 is powered on) may be displayed for the same period of time, and the shifted image displayed first when the display device 10 is powered on may be displayed for a period of time maximum twice longer than the period of time during which the other shifted images are displayed.

Unlike in the display device 10 of the embodiment in FIG. 1, the shifted image displayed first when a display device is powered on may not be determined based on the shift path value SPV before the display device was powered off. In this case, when the display device is powered on after being powered off, the original image data IMAGE may be processed to be displayed at a location to which no image is shifted, e.g., a start location on a preset shift path. Accordingly, the display panel 100 may display the first shifted image S1.

Therefore, shifted images (e.g., the first through sixth shifted images S1 through S6 of FIG. 6) corresponding to the first few locations on the preset shift path are repeatedly displayed whenever the display device is powered on after being powered off.

Accordingly, the shifted images corresponding to the first few locations on the preset shift path are displayed for a longer time than other shifted images corresponding to later locations on the preset shift path during the entire period of time that the display device is used. In addition, the occurrence of an afterimage effect from image shifting may be reduced or prevented.

On the other hand, in the display device 10 according to the embodiment of FIG. 1, despite repeated power on and off, an image shift condition may be satisfied the same number of times for each shifted image along a preset shift path, and all shifted images on the preset shift path may be displayed for the same period of time or for the same condition.

An embodiment of a method (hereinafter, referred to as "edge scaling") for enlarging a portion of a display image and filling the blank BK of FIG. 3 with the enlarged portion, instead of black image data, will now be described.

More specifically, in the display device 10 according to FIG. 1, the blank BK between an edge of the display panel 100 and an edge of a shifted image is filled with black image data in the embodiment of FIG. 3. However, in another embodiment, the blank BK may be filled with image data different from black image data. For example, the image shift controller 420 may perform edge scaling by enlarging a portion of the display image adjacent to the blank BK and then filling the blank BK with the enlarged portion.

Figure 9:
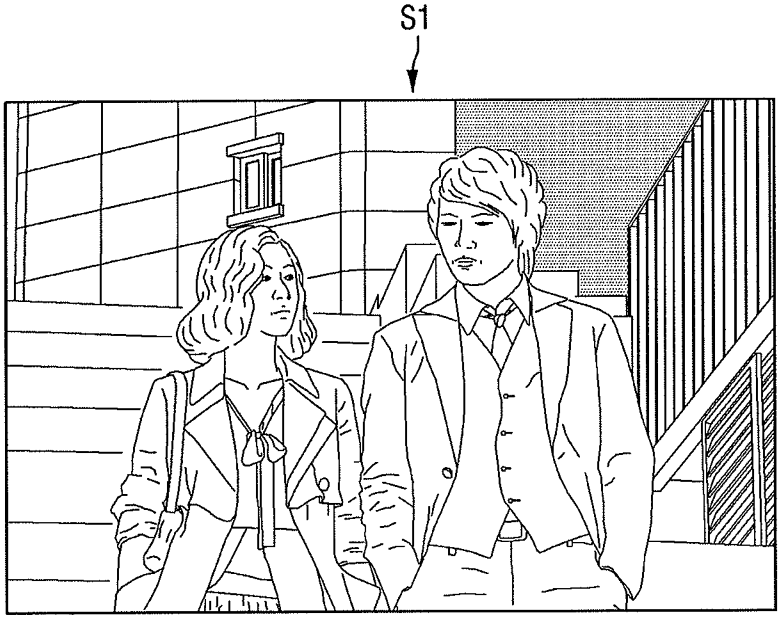
FIG. 9 illustrates an example of a non-shifted image.
Figure 10:
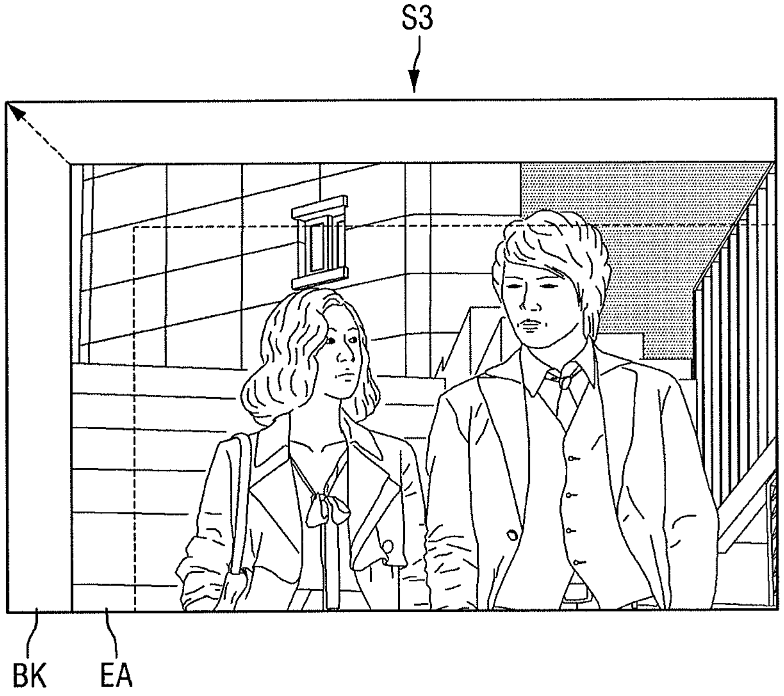
FIG. 10 illustrates an example of a shifted image which is shifted twice.
Figure 11:
FIG. 11 illustrates an example of edge scaling on a shifted image.

FIG. 9 illustrates an example of the first shifted image S1 which is a non-shifted image on the display panel 100. FIG. 10 illustrates an example of the third shifted image S3 obtained by shifting the first shifted image S1 of FIG. 9 twice. FIG. 11 illustrates an example of an image obtained by performing edge scaling on the third shifted image S3 of FIG. 9.

Referring to FIGS. 9 and 10, the first shifted image S1 of FIG. 9 may become the third shifted image S3 of FIG. 10 when a shift condition is satisfied twice. In the case of the shift path illustrated in FIG. 4, a blank BK corresponding to no image data may be formed in the third shifted image S3 between an upper edge of the third shifted image S3 and the upper edge of the display panel 100 and a left edge of the third shifted image S3 and the left edge of the display panel 100. The image shift controller 420 may set a portion of the third shifted image S3 which is adjacent to the blank BK as an enlargement area EA.

Referring to FIGS. 10 and 11, the image shift controller 420 may perform edge scaling by enlarging an image of the enlargement area EA and filling the blank BK and the enlargement area EA with the enlarged enlargement area EA. In the embodiments of FIGS. 10 and 11, a ratio of the area of the enlargement area EA to the area of the blank BK is 1:1. However, in another embodiment, and the ratio of the area of the enlargement area EA to the area of the blank BK may be different, for example, in order to reduce distortion of the display image or to reduce the load on the image shift controller 420 required for edge scaling.

Figure 12:
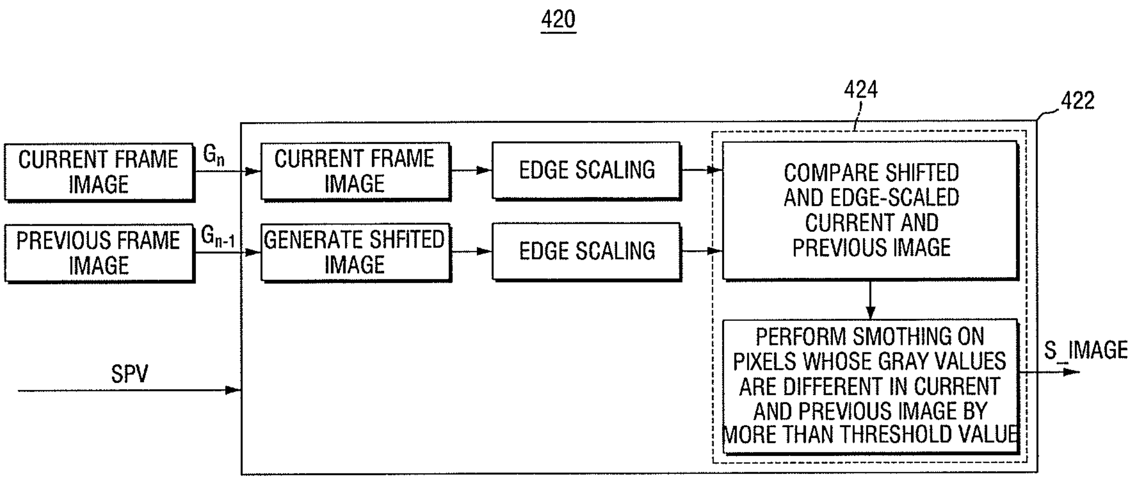
FIG. 12 illustrates an embodiment of an image shift controller.

FIG. 12 illustrates an embodiment of an image shift controller 420 which performs image smoothing, in addition to image shifting and edge scaling, in order to limit a difference in gray level between a previous frame image Gn−1 and a current frame image Gn to a predetermined threshold value or less.

Referring to FIG. 12, the image shift controller 420 includes an image shift processor 422 including an image smoother. The image shift processor 422 receives the current frame image Gn corresponding to original image data IMAGE and the previous frame image Gn−1 stored in a memory 430 and generates a shifted image for each of the current frame image Gn and the previous frame image Gn−1 by referring to a shift path value SPV. For example, when a shift condition is satisfied when the current frame image Gn is received, the shifted image for the current frame image Gn and the shifted image for the previous frame image Gn−1 may be different.

Next, the image shift processor 422 may perform edge scaling on each of the shifted image for the current frame image Gn and the shifted image for the previous frame image Gn−1. The shifted and edge-scaled image for the current frame image Gn and the shifted and edge-scaled image for the previous frame image Gn−1 may be sent to the image smoother.

The image smoother compares the shifted and edge-scaled image for the current frame image Gn and the shifted and edge-scaled image for the previous frame image Gn−1 and performs image smoothing such that a difference in color, brightness, and/or gray level (represented by RGB pixels) between corresponding pixels of the shifted and edge-scaled image for the current frame image Gn and the shifted and edge-scaled image for the previous frame image Gn−1 does not exceed a predetermined threshold value.

Figure 13:
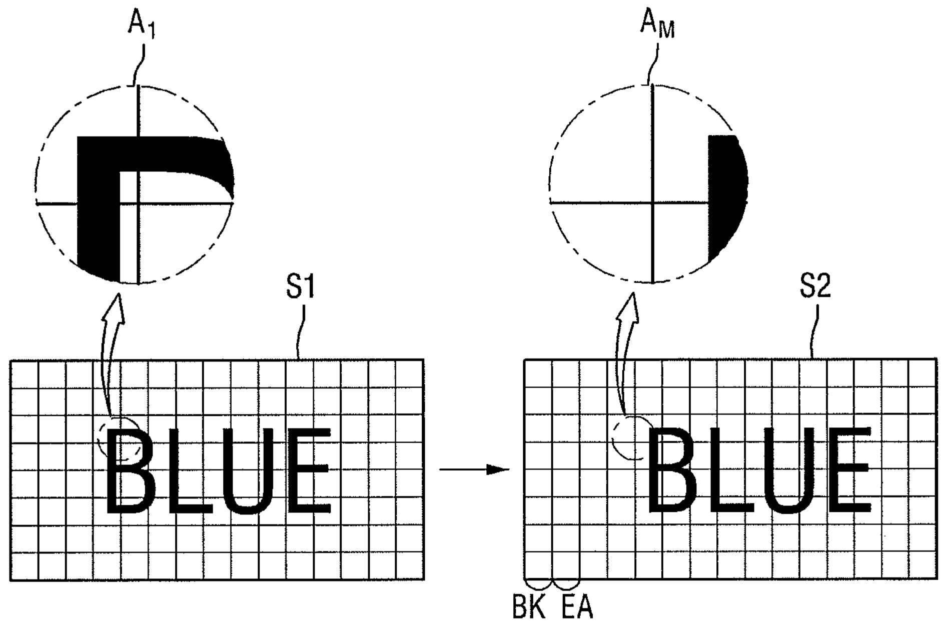
FIG. 13 illustrates an embodiment of a non-shifted and a second shifted image.
Figure 14:
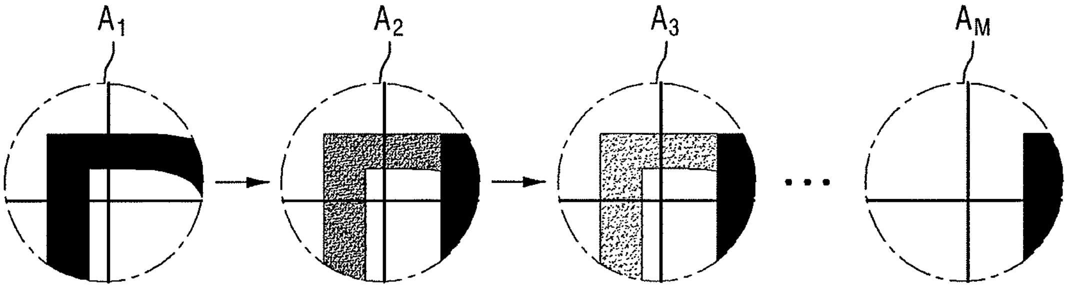
FIG. 14 illustrates an embodiment of an image smoothing process.

FIGS. 13 and 14 illustrate embodiments of image smoothing performed by the image shift controller 420. More specifically, FIG. 13 illustrates a diagram illustrating a first shifted image S1, which is a non-shifted display image corresponding to original image data IMAGE, and a second shifted image S2 obtained by shifting the first shifted image S1 once on a preset shift path. FIG. 14 illustrates an embodiment of a step-by-step image smoothing process.

Referring to FIG. 13, the original image data IMAGE having "BLUE" at the center against a lattice pattern in the background is displayed as the first shifted image S1, which corresponds to a non-shifted image, on a display panel 100. When an image shift condition is satisfied, the image shift controller 420 may shift the first shifted image S1 to a next location on the preset shift path to generate the second shifted image S2. In addition, a blank BK may be formed between a left edge of the second shifted image S2 and a left edge of the display panel 100. The image shift controller 420 may perform edge scaling by enlarging an image of an enlargement area EA adjacent to the blank BK in the second shifted image S2 and filling the blank BK and the enlargement area EA with the enlarged enlargement area EA.

When the image shift condition is satisfied, and thus when a shifted and edge-scaled image for a previous frame corresponds to the first shifted image S1 on the left side of FIG. 13 and a shifted and edge-scaled image for a current frame corresponds to the second shifted image S2 on the right side of FIG. 13, the image smoother may compare the first shifted image S1 on the left side of FIG. 13 with the second shifted image S2 on the right side of FIG. 13 and perform image smoothing on pixels which are different in color, brightness, and/or gray level by a predetermined threshold value or more in order to limit the difference.

For easy comparison of the first shifted image S1 and the second shifted image S2, images displayed at the same location on the display panel 100 are illustrated as a first enlarged portion A1 and an Mth enlarged portion AM in FIG. 13, where M is a natural number greater than 1.

Referring to the first enlarged portion A1 and the Mth enlarged portion AM, when the first shifted image S1 changes to the second shifted image S2, gray values of some pixels of the shifted and edge-scaled image for the current frame and the shifted and edge-scaled image for the previous frame may change abruptly from a white gray value to a black gray value. Such an abrupt change in the gray values of the pixels may be perceived as screen flicker, thus degrading display quality.

The image smoother may compare shifted and edge-scaled images for two successive frames and modulate the shifted and edge-scaled image for a current frame, such that a difference in gray value between the two images does not exceed a predetermined threshold value for pixels whose gray values are different in the two images by more than a predetermined threshold value. For example, the image smoother may modulate the shifted and edge-scaled image for the current frame such that the gray values of the above pixels are gradually increased or decreased at a predetermined rate over frames. For example, the gray values of the pixels may be increased or decreased by one gray value in each frame.

Referring to FIG. 14, when the first shifted image S1 changes to the second shifted image S2, the image shift controller 420 may modulate a shifted and edge-scaled image, such that a gray value is gradually reduced at a predetermined rate over frames for pixels whose gray values change from a black gray value to a white gray value.

Figure 15:
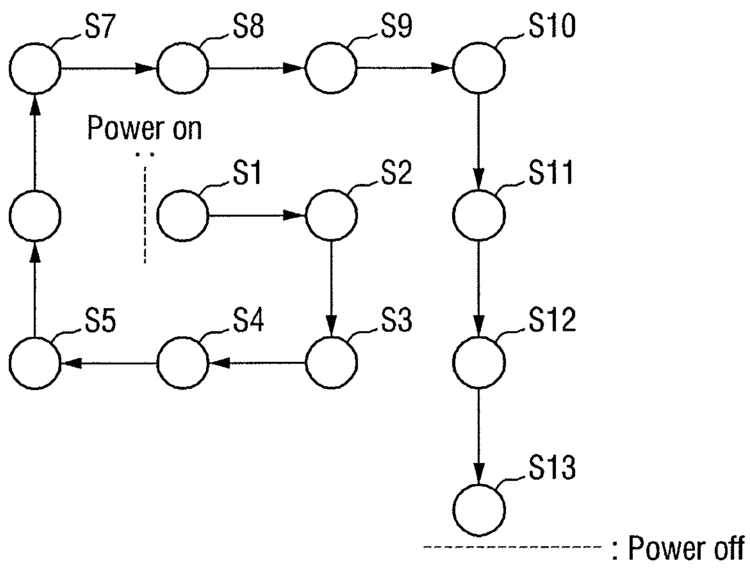
FIG. 15 illustrates another embodiment of shifting an image.
Figure 16:
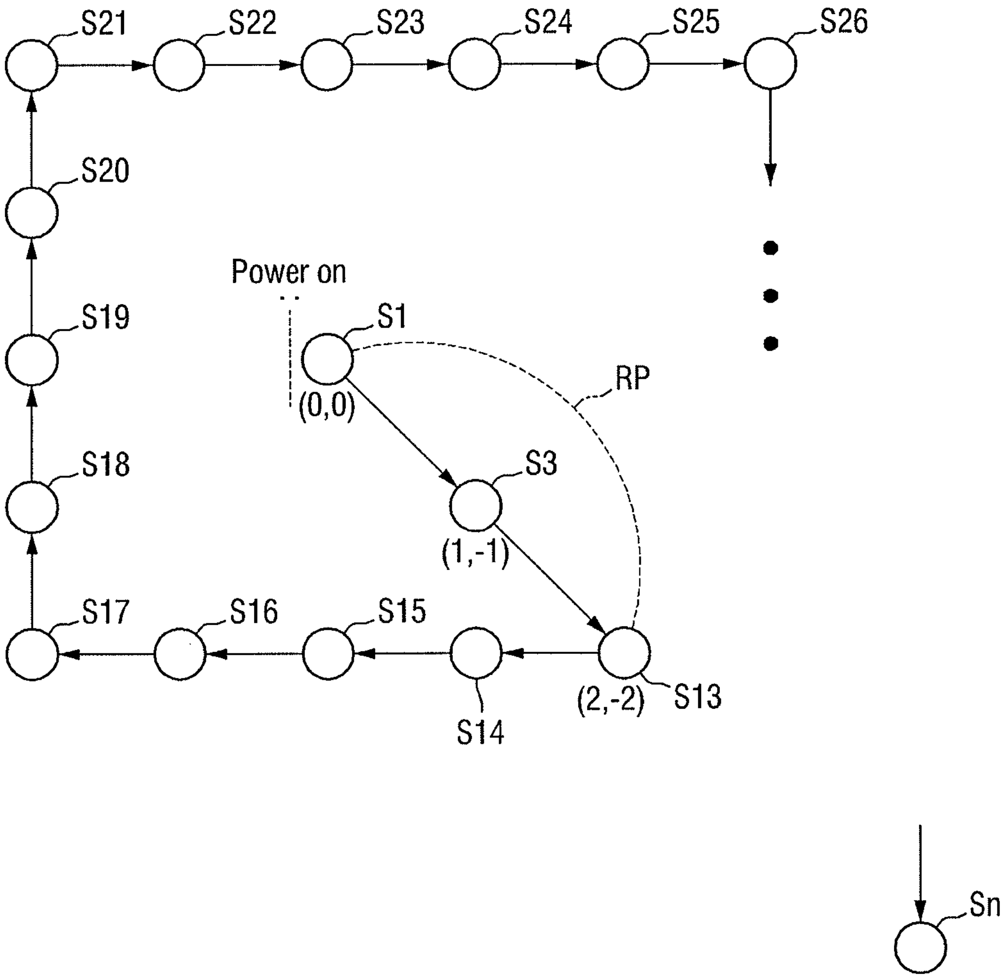
FIG. 16 illustrates another embodiment of shifting an image.

FIGS. 15 and 16 illustrate additional embodiments of an image shift process performed by the image shift controller 420. More specifically, FIG. 15 illustrates examples of locations and directions for shifting an image sequentially along a preset shift path having a quadrilateral spiral pattern for a period of time until the display device 10 is powered off after being powered on for the first time. FIG. 16 illustrates locations and directions for shifting an image sequentially along the preset shift path having the quadrilateral spiral pattern for a period of time until the display device 10 is powered on after being powered off in FIG. 15 and then powered off again.

Referring to FIGS. 15 and 16, the image shift controller 420 is different from the image shift controller 420 in other embodiments in that it does not display a shifted image, which corresponds to a last shift path value SPV stored in the memory 430, as the first image displayed when the display device 10 is powered on after being powered off. Rather, in these embodiments, the image shift controller 420 displays a first shifted image S1, which corresponds to a non-shifted display image for original image data IMAGE, on the display panel 100.

For example, when the display device 10 is powered off while a thirteenth shifted image S13 is displayed as illustrated in FIG. 15 and later powered on again, the image shift processor 422 may not perform an image shift. Accordingly, the first shifted image S1 may be displayed on the display panel 100. Then, the image shift processor 422 may shift the first shifted image S1 sequentially along a reduced path RP to the location of the thirteenth shifted image S13 corresponding to the shift path value SPV stored in the memory 430, e.g., a shift index SI of 13 or shift coordinate values of (2,−2).

In the embodiment of FIG. 16, the reduced path RP extends from shift coordinate values (0,0) of the first shifted image S1 to shift coordinate values (2,−2) of the thirteenth shifted image S13, as an x-direction coordinate value and a y-direction coordinate value in the shift coordinate values (0,0) of the first shifted image S1 are increased and decreased by one per location.

In another embodiment, the reduced path RP may extend to a shifted image (e.g., the thirteenth shifted image S13 of FIG. 16) corresponding to the stored shift path value SPV via one immediate shifted image (e.g., a third shifted image S3 of FIG. 16) or via two or more intermediate shifted images.

In another embodiment, the reduced path RP may extend to the shifted image corresponding to the stored shift path value SPV directly from the location of the first shifted image S1 without an intermediate shifted image.

Figure 17:
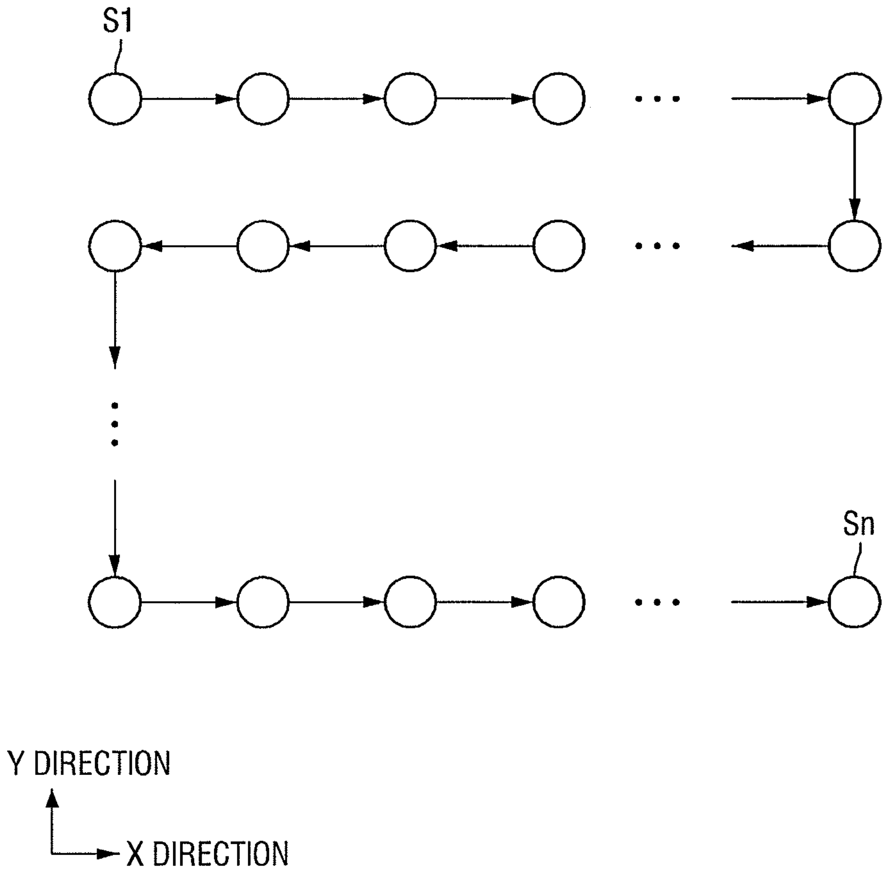
FIG. 17 illustrates another embodiment of shifting an image.
Figure 18:
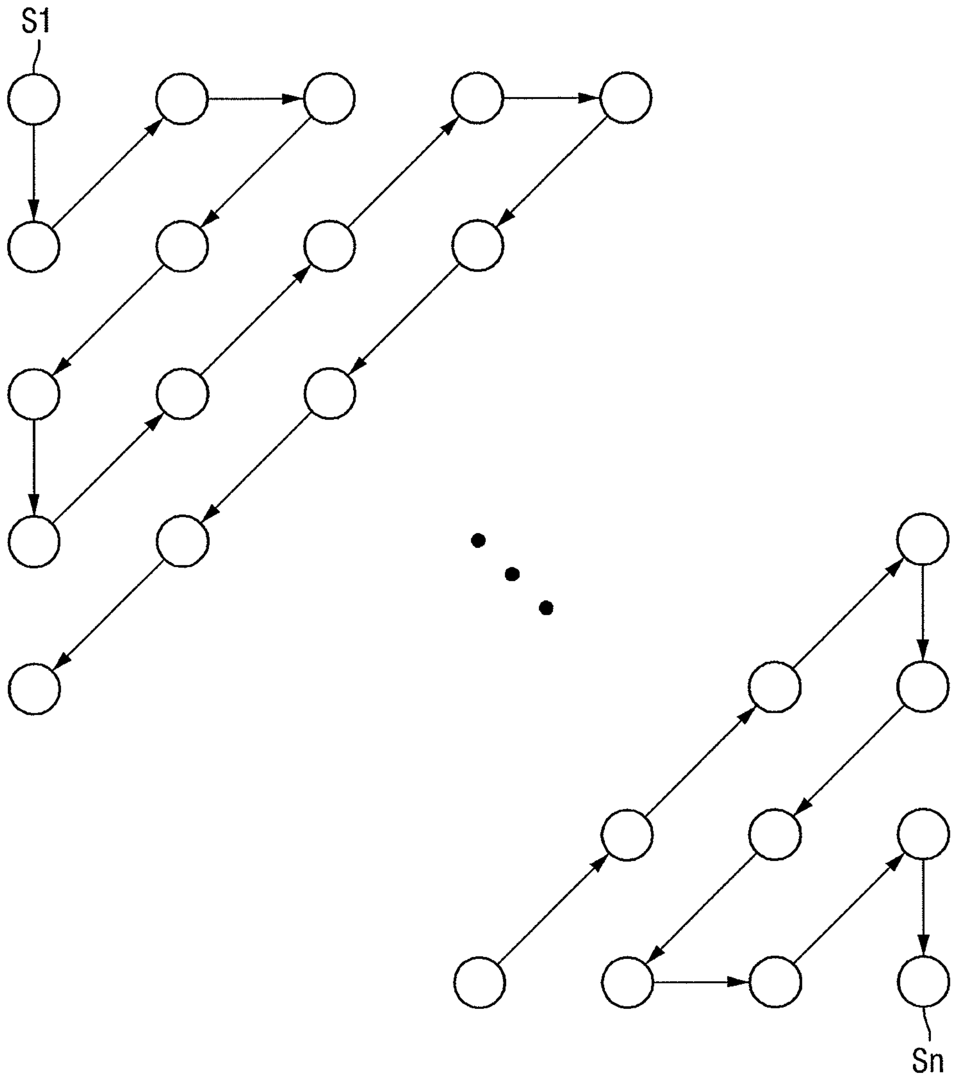
FIG. 18 illustrates another embodiment of shifting an image.

FIGS. 17 and 18 illustrate other embodiments of a preset shift path along which an image is shifted by an image shift controller. More specifically, FIG. 17 illustrates an embodiment of locations and directions for shifting an image sequentially along a preset shift path having a zigzag pattern. FIG. 18 illustrates an embodiment of locations and directions for shifting an image sequentially along a preset shift path having a diagonal pattern.

Referring to FIG. 17, the preset shift path of the display device 10 has a zigzag pattern in which, in a repeated manner, an image is shifted multiple times from the left to the right (a positive x direction), shifted downward once (a negative y direction), shifted multiple times from the right to the left (a negative x direction), shifted upward once (a negative y direction), and then shifted multiple times from the left to the right.

Referring to FIG. 18, the preset shift path of the display device 10 is set so that an image is shifted mostly in a diagonal direction. The preset shift path may be different from the patterns in FIGS. 17 and 18 in other embodiments.

The processors, controllers, shift operations, and other computational features of the embodiments disclosed herein may be implemented in logic which, for example, may include hardware, software, or both. When implemented at least partially in hardware, the processors, controllers, shift operations, and other computational features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the processors, controllers, shift operations, and other computational features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods herein.

Also, another embodiment may include a computer-readable medium, e.g., a non-transitory computer-readable medium, for storing the code or instructions described above. The computer-readable medium may be a volatile or non-volatile memory or other storage device, which may be removably or fixedly coupled to the computer, processor, controller, or other signal processing device which is to execute the code or instructions for performing the method embodiments described herein.

By way of summation and review, flat panel displays are used for a variety of indoor and outdoor purposes. When used, for example, to display public information, flat panel displays may display one still image for a long period of time or may repeatedly display several still images at relatively long time intervals. This may produce an effect (e.g., an afterimage effect) which adversely affects display quality. In accordance with one of more of the aforementioned embodiments, afterimage and/or other effects created when a display device displays one still image for a long time or repeatedly displays several still images at relatively long time intervals may be reduced or prevented.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the invention as set forth in the following claims.

What is claimed is:

1. A display device, comprising:

a controller to receive original image data and output a display image signal; and a display panel to receive the display image signal and display a display image corresponding to the display image signal, wherein:

the controller includes:

an image shift controller to generate shifted image data by modulating the original image data to shift the display image sequentially along a preset shift path on the display panel; and a memory to store a shift path value indicating a distance by which the display image has been shifted on the preset shift path, the shift path value to be stored in the memory when the display device is powered on and to be retained in the memory when the display device is powered off; and the image shift controller generates the display image signal by processing the shifted image data, and when the display device is powered on after being powered off, the image shift controller generates shifted image data corresponding to a shift path value for a start location on the preset shift path, and then generates shifted image data corresponding to the shift path value stored in the memory, wherein the image shift controller includes an image smoother configured to modulate the shifted image data by increasing or decreasing gray values of pixels such that a difference in the gray values of the pixels between successive frames does not exceed a predetermined threshold value, and wherein, for each pixel whose gray value in the shifted image data for a current frame differs from the corresponding pixel in the shifted image data for a previous frame by more than the predetermined threshold value, the image smoother is configured to increase or decrease the gray value of that pixel by only one gray value per frame.

2. The device as claimed in claim 1, wherein the image shift controller is to:

compare image data for at least two successive frames; and when a proportion of same image data in the at least two successive frames exceeds a preset threshold value, generate the shifted image data by modulating the original image data to shift the display image to a next location on the preset shift path.

3. The device as claimed in claim 2, wherein the image shift controller is to:

compare image data corresponding to at least two successive frames;

count the image data corresponding to the at least two successive frames as being identical when the proportion of the same image data exceeds the preset threshold value; and generate the shifted image data by modulating the original image data to shift the display image to a next location on the preset shift path, when a cumulative count value for image data corresponding to three or more frames is equal to or greater than a preset threshold value.

4. The device as claimed in claim 1, wherein the image shift controller is to:

generate the shifted image data by modulating the original image data to shift the display image continuously and sequentially along a series of locations on the preset shift path at predetermined time intervals.

5. The device as claimed in claim 1, wherein the preset shift path includes a quadrilateral spiral pattern which winds outwardly from a center location.

6. The device as claimed in claim 1, wherein the preset shift path includes a zigzag pattern in which the display image is to be shifted in a first direction multiple times, shifted in a second direction once, and then shifted in a third direction multiple times in a repeated manner.

7. The device as claimed in claim 1, wherein:

a display image corresponding to the shifted image data includes a blank between at least an edge of the display panel and an edge of the display image, and the blank corresponds to no image in the original image data.

8. The device as claimed in claim 7, wherein the blank of the display image corresponding to the shifted image data is to be filled with black image data.

9. The device as claimed in claim 7, wherein:

a portion of the display image adjacent to the blank is to be enlarged; and the blank of the display image corresponding to the shifted image data is to be filled with the enlarged portion.

10. The device as claimed in claim 1, wherein the display image is to be shifted by one pixel column or one pixel row for each shift.

11. The device as claimed in claim 1, wherein the memory is a nonvolatile memory.

12. The device as claimed in claim 11, wherein:

the memory includes a lookup table indicating the preset shift path; and the image shift controller is to receive an operation start signal when the display device is powered on, read a shift path value stored in the memory based on the operation start signal, and generate shifted image data corresponding to the stored shift path value by referring to the lookup table.

* * * * *